Patented Mar. 6, 1951

2,544,574

UNITED STATES PATENT OFFICE 2,544,574

CATALYST REGENERATION

Scott W. Walker and Allen G. Eickmeyer, Tulsa, Okla., assignors to Stanolind Oil and Gas Company, Tulsa, Okla., a corporation of Delaware No Drawing. Application September 25, 1947,
Serial No. 776,156

6 Claims. (Cl. 260—449.6)

This invention relates to the conversion of carbon monoxide and hydrogen to liquid products in the presence of synthesis catalyst. More specifically, it deals primarily with the regeneration of a finely divided iron catalyst which has been employed in a dense turbulent suspended phase for the conversion of hydrogen and oxides of carbon into hydrocarbons and oxygenated compounds.

During synthesis, free carbon and heavy wax are deposited on the finely divided iron catalyst which results in an undesired loss in activity and in the lowering of the density of the fluidized solids. Also in the case of fixed bed operations, such deposits tend to plug the catalyst bed and the uniform flow of synthesis gas is not obtained.

We have now found that iron catalyst containing carbonaceous materials either as the iron carbide, coke, or wax, may be regenerated or restored to high activity and density by treating such catalyst with hydrogen to which steam has been added in a proportion of between about 5 and 40% and effecting the contacting at an elevated temperature.

The hydrocarbon synthesis process with which this invention is concerned, employs an iron catalyst and is conducted at a temperature of between about 400 and 750° F. and at pressures of between about 75 and 600 pounds per square inch. A preferred range of pressure is between 225 and 450 pounds per square inch, e. g., about 250 pounds per square inch. The space velocity through the reactor should be between about 5 and 25 cubic feet of carbon monoxide per hour per pound of catalyst within the reactor. A hydrogen to carbon monoxide ratio of between about 1 to 1 and 5 to 1 can be used with an optimum carbon monoxide content of between about 9 and about 30% based upon the total gas feed to the reactor. Ordinarily, the actual feed to the synthesis reactor will also include some carbon dioxide in varying proportions. Thus, the total feed should be a mixture of hydrogen, carbon monoxide and carbon dioxide in the ratio of about 1-6:1:0-5, a ratio of about 3:1:1 being preferred.

The catalyst for use in such a process should be in a finely divided form capable of being fluidized by gas flowing upwardly through the bed at low velocities to produce a turbulent suspended catalyst phase which should be maintained at an apparent bulk density within a selected critical range.

The catalyst particles can be of the order of between about 2 and 500 microns, preferably 20 to 100 microns. A satisfactory catalyst, for example, is one in which 100% passes a 40 mesh screen, a minimum of 50% passes a 200 mesh screen, and a maximum of 25% passes a 325 mesh screen. In practicing our invention it is preferred to use as a starting material for catalyst preparation a finely divided iron oxide which will yield the desired distribution of particle sizes.

With vertical gas velocities of the order of between about 0.3 and 5.0 feet per second, preferably between about .5 and 3, for example, about 2 feet per second, a liquid-like dense phase of catalyst is obtained. In such a liquid-like dense turbulent phase, the bulk density of the catalyst is between about 10 and 80%, preferably between about 40 and 70%, e. g., about 60% of the density of the settled catalyst material. Normally a catalyst prepared in accordance with our invention will have a settled bulk density of between about 120 and 150 pounds per cubic foot. The vertical or linear velocity of the gas is, in any event, regulated so as to produce a turbulent suspension of catalyst within the reaction zone having an apparent density of about 45 to 120 pounds per cubic foot.

In the case of iron catalyst, the removal of excessive carbon is of particular importance because on extended use the catalyst picks up so much carbon by physical or chemical combination that the particle size and density are materially altered which in turn interferes not only with catalyst activity but also interferes with the maintenance of the desired liquid-like, dense phase condition of the catalyst in the contacting zone. The bulk density of the fluidized catalyst may drop from an initial 80 or 100 pounds per cubic foot to less than 20 pounds per cubic foot. The continuous regeneration of a continuously segregated portion of the catalyst makes it possible to maintain the catalyst at a more nearly uniform dense phase density as well as at uniform activity during long periods of use, e. g., weeks or months as distinguished from hours or days. This is a feature of great importance in systems designed for a given dense phase level in the reactor.

According to our invention the proposed regeneration comprises subjecting used iron catalyst containing, for example, about 30% total carbon, as carbide, coke or wax, with a mixture of hydrogen and steam at an elevated temperature, for example, between about 900 and 1400° F. The treatment may be accomplished either in a fixed bed in the case of pelleted catalyst or in a fluid bed in the case of a finely divided or fluidizable catalyst.

The time required for the removal of the carbon will vary with operating conditions, but ordinarily the time necessary will be between about 2 and 20 hours. In a continuous operation between about 5% and 85% of the volume of catalyst maintained in the reactor may be undergoing regeneration in a separate zone and recycled to the reactor after cooling to about synthesis temperature. In another embodiment about 20% of the catalyst can be treated batchwise for about 5 hours at about 1000–1100° F.

The "carbon" most easily removed appears to be that in the form of carbides, such as $Fe_2C$ or higher carbides, carbon of this form being readily converted to methane. Other forms of carbon such as "coke" and wax are more difficultly removable. Thus, it may be desirable to effect the regeneration in two or more stages with progressively increasing temperature. For example, the first stage for the carbide removal may be at a temperature of about 900 to 1000° F. and a subsequent stage at a higher temperature of about 1100° F. to 1400° F..

The mechanism of the carbon removal from the catalyst depends upon operating conditions but in any event it is desired to avoid oxidation of the iron. To this end the steam and hydrogen are proportioned so as to be neutral or reducing to metallic iron. In general, the proportions of hydrogen and steam and the temperature of the treating step can be correlated in terms of the following equation:

Maximum percent water $= 10 + .05$ ($T$ °F.$- 700$)

Thus, the correlation between the contacting temperature and the allowable percent water in the reducing gas to avoid oxidation of the metal may be tabulated as follows:

| Temperature | Water in Reducing Gas |
|---|---|
| °F. | Per cent |
| 600 | 5 |
| 700 | 10 |
| 800 | 15 |
| 900 | 20 |
| 1,000 | 25 |
| 1,100 | 30 |
| 1,200 | 35 |
| 1,250 | 37.5 |
| 1,300 | 40.0 |

At the lower temperatures and under high pressure, the carbon is converted to methane. As the temperature is raised oxidation to CO and $CO_2$ become increasingly important and the rate of carbon removal is greatly accelerated. High pressure favors the formation of methane but is of less importance to the oxidation reactions. For example, at a pressure of 50 p. s. i. g. or less, carbon removal would be effected primarily by oxidation at a temperature of about 1200° F. in the presence of about 35% water with hydrogen.

In general, the hydrogen to water ratios are those which are in equilibrium with metallic iron and $Fe_3O_4$. In the preferred operation the inlet steam concentration is controlled so as to produce an effluent from the treater having a hydrogen to water ratio which is about 20% greater than the equilibrium value.

Typical operating conditions would include the following:

Temperature: 1050° F.
Pressure: 250 p. s. i. g.
$H_2:H_2O$ ratio: 3.1
Space velocity about 25 s. c. f. h./lb. catalyst In the case of fluid bed regeneration, the upper temperature limit is governed by the tendency of iron catalyst to defluidize at higher temperatures, but a temperature of about 1050° F. causes the conversion to proceed at a reasonable rate without adversely affecting the fluidization characteristics of the finely divided catalyst.

Pressures in the range of about atmospheric and 400 p. s. i. g. may be used and as disclosed hereinabove, the higher pressures and low space velocities are favorable to methane formation. It is contemplated, however, that space velocities in the range of between about 2 and 50 c. f. h./lb. catalyst may be used.

In practicing a preferred embodiment of our invention, a finely divided promoted iron catalyst which includes a carbonaceous deposit in the form of carbide, coke, wax, or the like, is treated with a mixture of hydrogen and water vapor while in the fluidized state at temperatures which are compatible with fluidization. At higher temperatures the catalyst may be aerated. The treating gas mixture should be neutral or only slightly oxidizing to metallic iron or slightly reducing to $Fe_3O_4$. It is believed, however, that the retention of some oxide is important since it tends to inhibit agglomeration at high temperatures and because it corresponds to the equilibrium synthesis catalyst in terms of oxide content as used in the synthesis. This retention of the oxide permits the use of the regenerated catalyst in the synthesis without a separate oxidation step and without the danger of defluidization which has been observed when starting up with completely reduced finely divided catalyst.

From the above description, it will be apparent to those skilled in the art that the objects of this invention have been attained and that by our system it is possible to maintain the desired fluidization and catalyst activity characteristics of finely divided iron catalyst. Although a specific embodiment of our invention has been described, it should be understood that this is by way of example only and that the invention is not limited to such details. Furthermore, modifications in our invention will become apparent to those skilled in the art in view of our description, and such modifications and alternatives are contemplated as coming within the scope of the invention defined by the appended claims.

What we claim is:

1. The method of treating iron catalyst, the density of which has been decreased by the accumulation of a carbonaceous deposit thereon during its use in the synthesis of hydrocarbons from a mixture of hydrogen and carbon monoxide which comprises the steps of contacting said catalyst of reduced density having said carbonaceous deposit thereon with a gaseous mixture consisting essentially of hydrogen and between about 5 and 40 volume percent of water vapor, effecting said contacting at a temperature of between about 600 and about 1300° F. for a period of between about 2 and about 20 hours under a pressure of about 50 p. s. i. whereby constituents of the gaseous mixture preferentially react with the carbonaceous material to form methane and oxides of carbon without materially oxidizing the iron catalyst.

2. In the method of removing carbonaceous contaminants from finely divided iron catalyst comprising a preponderant proportion of iron carbide and a minor proportion of iron oxide, the steps of contacting the catalyst with a mixture of hydrogen and between about 5 and 40% of water vapor at an elevated temperature between about 600 and 1300° F. and continuing the treatment of the catalyst with said mixture at an elevated temperature for between about 2 and about 20 hours whereby substantially all of the carbonaceous material is removed from the catalyst and the relative proportion of iron oxide is not substantially increased.

3. The method of reconditioning finely divided iron carbide-iron oxide catalyst of decreased density due to an accumulation of a carbonaceous substance which comprises the steps of contacting said finely divided iron catalyst containing such accumulation with a substantially neutral mixture of hydrogen and between about 5 and 40 volume percent water vapor at a temperature of between about 600 and about 1300° F. whereby the carbonaceous material is reacted with the said mixture of hydrogen and water vapor to increase the density without substantially altering the proportion of iron oxide.

4. The method of treating a finely divided iron catalyst comprising a major proportion of metallic iron and a minor proportion of iron oxide, the density of which has been decreased by the accumulation of a carbonaceous deposit thereon during its use in the synthesis of hydrocarbons from a mixture of hydrogen and carbon monoxide which comprises the steps of contacting said catalyst having a carbonaceous deposit thereon with a gaseous mixture consisting essentially of hydrogen and water vapor, at a temperature of between about 600 and about 1400° F., the volume per cent of water in said gaseous mixture being determined by the expression $$10 + .05(T - 700)$$

wherein T is the regeneration temperature in degrees F., and effecting such contacting for a period of between about 2 and about 20 hours under a pressure of below about p. s. i. whereby constituents of the gaseous mixture preferentially react with the carbonaceous material to produce gaseous products without materially oxidizing the iron catalyst.

5. In the process wherein compounds of higher molecular weight are synthesized from hydrogen and carbon monoxide in the presence of a dense phase liquid-like mass of a finely divided iron catalyst comprising a substantial proportion of free iron and wherein a carbonaceous material is deposited upon the finely divided iron during the synthesis thereby reducing the density of the catalyst, the improvement which comprises contacting a portion of the catalyst containing said carbonaceous material at an elevated temperature and in a dense phase liquid-like condition with a gaseous mixture which is capable of reacting with the carbonaceous material but is substantially neutral with respect to said iron at an elevated temperature between about 600 and about 1300° F., said gaseous mixture consisting essentially of hydrogen and between about 5 and about 40 volume percent water vapor, the volume percent of water vapor permissible in said mixture increasing with temperature by increments of 5 volume percent for each 100 degrees of temperature above 600° F. whereby a catalyst substantially free of carbonaceous material is obtained and the original proportion of free iron in the treated catalyst is substantially unchanged.

6. In the method of regenerating finely divided iron catalyst which is of reduced activity and density due to the accumulation of carbonaceous material thereon, the steps of maintaining a body of the iron catalyst within a treating zone and contacting said catalyst with a mixture consisting essentially of hydrogen and water vapor at a temperature of between about 600° and about 1300° F., the volume per cent of water vapor in said mixture being determined by the expression:

$$10 + .05(T - 700)$$

wherein T is the regeneration temperature in degrees F. and whereby constituents of the gaseous mixture preferentially react with the carbonaceous material on the catalyst to form methane and oxides of carbon without materially altering the state of oxidation of the iron catalyst.

SCOTT W. WALKER.
ALLEN G. EICKMEYER.

REFERENCES CITED

The following references are of record in the file of this patent:

UNITED STATES PATENTS

| Number | Name | Date |
| --- | --- | --- |
| 2,238,726 | Feisst et al. | Apr. 15, 1941 |
| 2,360,787 | Murphree et al. | Oct. 17, 1944 |
| 2,369,956 | Feisst et al. | Feb. 20, 1945 |
| 2,424,467 | Johnson | July 22, 1947 |
| 2,429,751 | Gohr et al. | Oct. 28, 1947 |
| 2,438,584 | Stewart | Mar. 30, 1948 |

Certificate of Correction

Patent No. 2,544,574                                                      March 6, 1951

SCOTT W. WALKER ET AL.

It is hereby certified that error appears in the printed specification of the above numbered patent requiring correction as follows:

Column 5, line 42, after the words "below about" insert *50*;

and that the said Letters Patent should be read as corrected above, so that the same may conform to the record of the case in the Patent Office.

Signed and sealed this 1st day of May, A. D. 1951.

[SEAL]

THOMAS F. MURPHY,
*Assistant Commissioner of Patents.*